(12) United States Patent
König et al.

(10) Patent No.: US 6,723,817 B2
(45) Date of Patent: Apr. 20, 2004

(54) POLYISOCYANATES BLOCKED WITH EPSILON-CAPROLACTAM AND EITHER DIISOPROPYLAMINE OR 1,2,4-TRIAZOLE, THEIR PREPARATION AND USE

(75) Inventors: Eberhard König, Leverkusen (DE); Beate Baumbach, Burscheid (DE); Christian Füssel, Tönisvorst (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/298,773

(22) Filed: Nov. 18, 2002

(65) Prior Publication Data

US 2003/0130468 A1 Jul. 10, 2003

(30) Foreign Application Priority Data

Nov. 20, 2001  (DE) .......................................... 101 56 897

(51) Int. Cl.[7] .............................................. C08G 18/80
(52) U.S. Cl. ...................................... 528/45; 428/425.8
(58) Field of Search ......................... 528/45; 428/425.8

(56) References Cited

U.S. PATENT DOCUMENTS

| 4,500,696 A | | 2/1985 | Gras ........................... 528/45 |
| 5,350,825 A | * | 9/1994 | Konig et al. .................. 528/45 |
| 5,523,377 A | | 6/1996 | König et al. .................. 528/45 |
| 5,596,064 A | | 1/1997 | König et al. .................. 528/45 |
| 5,691,438 A | | 11/1997 | König et al. .................. 528/45 |
| 5,889,106 A | | 3/1999 | Kürek et al. ................. 524/589 |
| 5,961,878 A | | 10/1999 | König et al. ........... 252/182.21 |
| 6,242,530 B1 | * | 6/2001 | Konig et al. ................. 524/718 |
| 6,451,963 B1 | * | 9/2002 | Langel et al. ................ 528/480 |

FOREIGN PATENT DOCUMENTS

DE            33 28 134            2/1985

* cited by examiner

Primary Examiner—Rachel Gorr
(74) Attorney, Agent, or Firm—Joseph C. Gil; Thomas W. Roy

(57) ABSTRACT

The present invention relates to a blocked polyisocyanate containing:

| A1) | 40 to 70 equivalent % of a predominantly linear NCO prepolymer having an NCO content of 5.0 to 10.0 wt. %, |
| A2) | 30 to 60 equivalent % of an aliphatic lacquer polyisocyanate, |
| B1) | 30 to 60 equivalent % of epsilon-caprolactam and |
| B2) | 40 to 70 equivalent % of diisopropylamine or 1,2,4-triazole as blocking agents, | wherein the equivalent percents of isocyanate components A1) and A2) add up to 100 %, and the equivalent percents of blocking agents B1) and B2) add up to 100 to 110%, based on the equivalents of component A). The present invention also relates to a process for preparing these blocked polyisocyanates to coating compositions containing these blocked polyisocyanates and to metal substrates coated with these coating compositions.

4 Claims, No Drawings

POLYISOCYANATES BLOCKED WITH EPSILON-CAPROLACTAM AND EITHER DIISOPROPYLAMINE OR 1,2,4-TRIAZOLE, THEIR PREPARATION AND USE

FIELD OF THE INVENTION

The present invention relates to hybrid blocked polyisocyanates, a process for their preparation their use as a crosslinking component for films and coatings, preferably for deep-drawable and corrosion-resistant stoving lacquers, in particular for the coil-coating process.

BACKGROUND OF THE INVENTION

The formulation of blocked polyisocyanates with OH-containing polycondensates or polymers (polyesters or polyacrylates) to obtain binders for "one-component" stoving lacquers is known. The utilization of ε-caprolactam, diisopropylamine (DIPA) and 1,2,4-triazole for blocking the isocyanate groups is also known.

It is usual today to deform uncoated metal sheets, assemble these to form a vehicle body and provide them with a primer in an electrophoretic bath.

Another possibility is to provide the metal sheets postproduction with a suitable primer and store the coated coil temporarily. When the vehicle body is produced using the previously coated metal sheets, the coating must go through every deformation of the metal sheet undamaged.

An object of the present invention is to provide a coil coating having very good deformability and good corrosion protection.

It has now been found that the use of ε-caprolactam and either DIPA or 1,2,4-triazole as the blocking agent for the polyisocyanate component of the stoving lacquers provides coatings that have deep-drawability at room temperature and resistance to subsequent tearing after aging of the coatings.

SUMMARY OF THE INVENTION

The present invention relates to a blocked polyisocyanate containing

| | |
|---|---|
| A1) | 40 to 70 equivalent % of a predominantly linear NCO prepolymer having an NCO content of 5.0 to 10.0 wt. %, |
| A2) | 30 to 60 equivalent % of an aliphatic lacquer polyisocyanate, |
| B1) | 30 to 60 equivalent % of ε-caprolactam and |
| B2) | 40 to 70 equivalent % of diisopropylamine or 1,2,4-triazole as blocking agents, | wherein the equivalent percents of isocyanate components A1) and A2) add up to 100%, and the equivalent percents of blocking agents B1) and B2) add up to 100 to 110%, based on the equivalents of component A).

The present invention also relates to a process for preparing these blocked polyisocyanates, to coating compositions containing these blocked polyisocyanates and to metal substrates coated with these coating compositions.

DETAILED DESCRIPTION OF THE INVENTION

It is essential to the invention that a mixture of an NCO prepolymer having an elastifying effect (A1) and a highly branched lacquer polyisocyanate (A2) is used as the polyisocyanate component and a mixture of ε-caprolactam (B1) with either diisopropylamine or 1,2,4-triazole (B2) is used as the blocking agent, which dissociates at low temperature.

To prepare NCO prepolymer component A1), diisocyanates are reacted with dihydroxy compounds and, in small quantity, also trihydroxy compounds, in known manner. Preferably, 100 equivalent % of the diisocyanates are reacted with 40 to 45 equivalent % of the dihydroxy compounds and 5 to 10 equivalent % of the trihydroxy compounds.

Suitable diisocyanates include 1,6-diisocyanatohexane (HDI), 1-isocyanato-3,3,5-trimethyl-5-isocyanatomethyl cyclohexane (isophorone diisocyanate or IPDI), bis-(4-isocyanatocyclohexyl) methane ($H_{12}$ MDI or Desmodur® W, Bayer AG), 2,6- or 2,5-bis-isocyanatonorbornane, 1,4-bis-isocyanatomethyl cyclohexane and 1,3- or 1,4-tetramethylxylylene diisocyanate. Also suitable are aromatic diisocyanates such as 2,4- and 2,6-tolylene diisocyanate (TDI) and 4,4'- and 2,4'-diisocyanatodiphenyl methane (MDI). IPDI is preferred.

Suitable dihydroxy compounds the linear polyesters, polycarbonates and polyethers having a number average molecular weight of 500 to 3000, which are known from polyurethane chemistry. Preferred dihydroxy compounds are a mixture of adipic acid/neopentyl glycol/1,6-hexanediol polyesters having a number average molecular weight of 1700, in admixture with a polypropylene oxide polyether started on bisphenol A and having a molecular weight of 550. Additionally, low molecular weight diols having number average molecular weights of 62 to 400, such as neopentyl glycol or trimethyl pentanediol-1,3 may be used to raise the NCO content of the NCO prepolymer.

As indicated above, small quantities of trifunctional hydroxy compounds may also be used to improve the solvent resistance of the NCO prepolymer. Examples include trimethylolpropane or propylene oxide polyethers started on trimethylolpropane and having number average molecular weights of 250 to 1000.

The reactants are chosen such that the NCO prepolymers A1) have an NCO content of 5.0 to 10.0 wt. %.

Lacquer polyisocyanates A2) are known and are based on (cyclo)aliphatic diisocyanates having an NCO content of 12 to 25 wt. % and containing biuret, isocyanurate, allophanate, iminooxadiazine dione (asymmetrical trimer), urethane and/or uretdione groups. Examples of aliphatic and cycloaliphatic diisocyanates include 1,6-diisocyanatohexane (HDI), 1-isocyanato-3,3,5-trimethyl-5-isocyanatomethyl cyclohexane (isophorone diisocyanate or IPDI), bis-(4-isocyanatocyclohexyl) methane ($H_{12}$ MDI or Desmodur® W, Bayer AG), 2,6- and 2,5-bis-isocyanatonorbornane, 1,4-bis-isocyanatomethyl cyclohexane and 1,3- and 1,4-tetramethylxylylene diisocyanate. Polyisocyanates based on 1,6-diisocyanatohexane, IPDI and $H_{12}$ MDI and containing predominantly isocyanurate groups are preferred.

Preferably NCO component A contains about 85 wt. % flexible NCO prepolymer component A1) and about 15 wt. % high functional lacquer polyisocyanate A2). Based on the NCO group content, this ratio is displaced in favor of lacquer polyisocyanate component A2). For example, if the total NCO content of component A) is 8.5%, NCO prepolymer A1) contributes only about 62%, while lacquer polyisocyanate A2) contributes about 38%.

ε-caprolactam (B1) and either 1,2,4-triazole (B2) or diisopropylamine (B2) are used as the blocking agents. The equivalent ratio of blocking agent B1 to blocking agent B2 is preferably from 0.3:1 to 0.7:1 to 0.5:1 to 0.5:1. Preferably, the equivalents of B1 and B2 adding up to 1.0 mole for each mole of NCO groups.

In a preferred embodiment for preparing the blocked polyisocyanates according to the invention an NCO prepolymer A1) is prepared first by adding an initial charge of the diisocyanate, for example IPDI, at room temperature and then adding the OH components, for example polyesters, polyethers, diols and triols, with stirring. The reaction of the NCO groups with the OH components is initiated by heating to 100 to 110° C., and, when the calculated NCO content is reached or almost reached, the reaction is terminated. In the next step the NCO prepolymer is diluted with solvent (for example, solvent naphtha 100 solvent or 1-methoxypropyl acetate), and lacquer polyisocyanate A2), for example an HDI trimer, is added to form the total NCO component A1)+A2). The blocking reaction with ε-caprolactam (B1) is undertaken first at 100 to 110° C. until the calculated NCO content is reached, and then the remaining NCO groups are is reacted with either 1,2,4-triazole or diisopropylamine.

The reaction with 1,2,4-triazole is endothermic and requires a reaction temperature of approx. 100° C. To the contrary the reaction with diisopropylamine is exothermic, such that temperatures of only 40° C. to 80° C. are necessary to complete the reaction. When blocking of the NCO groups is complete, the blocked polyisocyanates according to the invention are ready for use and may also be diluted to working consistency with hydroxyl group-containing solvents, such as isobutanol or butyl glycol.

The hybrid blocked polyisocyanates according to the invention are polyhydroxyl compounds to form coating compositions that may be used to produce coatings on various substrates, such as wood, metal, glass, ceramic and plastics. They are preferably used to produce primers for coil coatings.

In addition to good corrosion resistance (salt spray test), the coil coating primers have flexibility and exceptional adhesion, which is manifested in the deep-drawability without damage of the coated metal sheets. Because the blocked polyisocyanates according to the invention are preferably aliphatic in character, i.e., they are prepared from aliphatic polyisocyanates, the primed coils may be stored before further processing, even outdoors, without the primer being broken down by light, which causes. By using the coated metal sheets obtained according to the present invention, cataphoretic coating can be omitted, for example in automotive construction.

The invention is further illustrated but is not intended to be limited by the following examples in which all parts and percentages are by weight unless otherwise specified.

EXAMPLES

Example 1

(According to the Invention)

A hybrid blocked polyisocyanate was composed of 0.625 equivalent % of NCO prepolymer A1), 0.375 equivalent % of lacquer polyisocyanate A2), 0.375 equivalent % of ε-caprolactam (component B1) and 0.625 equivalent % of 1,2,4-triazole (component B2), wherein the equivalents % of B1) and B2) were based on 1 equivalent of component A). Formulation:

| | | Component A1) |
|---|---|---|
| 340.0 g | (0.4 equiv.) | of an adipic acid/1,6-hexanediol, neopentyl glycol polyester having an OH number of 66 |
| 82.5 g | (0.3 equiv.) | of a polypropylene oxide polyether started on bisphenol A and having an OH number of 204 |

-continued

| | | |
|---|---|---|
| 10.4 g | (0.2 equiv.) | neopentyl glycol, MW 104 |
| 4.50 g | (0.1 equiv.) | trimethylolpropane, MW 134 |
| 222.0 g | (2.0 equiv.) | 1-isocyanato-3,3,5-trimethyl-5-isocyanatomethyl cyclohexane (isophorone diisocyanate, IPDI) |
| 659.4 g | (1.0 equiv.) | IPDI prepolymer NCO content: calculated: 6.36%; observed: 6.1% |
| | | Component A2) |
| 118.00 g | (0.6 equiv.) | of an isocyanurate-containing lacquer polyisocyanate based on 1,6-diisocyanato-hexane (HDI), having an NCO content of 21.4%, a viscosity at 23° C. of approx. 3000 mPas and a functionality of approx. 3.5 |
| 392.0 g | | solvent naphtha 100 solvent |
| | | Component B1) |
| 67.8 g | (0.6 equiv.) | ε-caprolactam |
| | | Component B2) |
| 69.0 g | (1.0 equiv.) | 1,2,4-triazole |
| 1306.2 g | (1.6 equiv.) | blocked NCO groups |
| | | Solids content: Calc. 70.0% |
| | | Viscosity at 23° C.: approx. 5500 mPas |
| | | Blocked NCO content: Calc. 5.1% |
| | | 1 equiv. blocked NCO groups: Calc. 816.0 g |

In the following example, the blocked polyisocyanate from Example 1 was combined as follows with a branched lacquer polyester (70% dissolved in 1-methoxypropyl acetate-2, OH content as supplied 1.4%, 1 equiv. OH groups=1214 g, Desmophen® 690, Bayer AG) to obtain a one-component coil coating primer at an NCO:OH equivalent ratio of 1:1, as follows:

| | |
|---|---|
| 1 equiv. blocked NCO groups = | 816 g; reduced quantity: 21.7 g |
| 1 equiv. OH groups from PE = | 1214 g; reduced quantity: 32.2 g |

Method:

The liquid (molten) OH components were added at room temperature to an initial batch of IPDI. The internal temperature was brought in stages to 110° C., with stirring. The reaction mixture was stirred for approx. 4 hours at this temperature until the calculated NCO content of 6.3% was almost reached. The HDI trimer, solvent naphtha 100 and ε-caprolactam were then added sequentially. This mixture was reacted for approx. 1 hour at 110° C. until the calculated NCO content of 3.3% was reached. 1,2,4-triazole was added, and stirring was continued for a further 3 hours at 110° C. until NCO was no longer detected by IR spectroscopy. An almost colorless solution having the properties set forth above was obtained.

Example 2

(According to the Invention)

The blocked polyisocyanate consisted of 0.625 equivalent % of flexible NCO prepolymer A1), 0.375 equivalent % of branched NCO component A2), 0.5 equivalent % of ε-caprolactam (component B1) and 0.5 equivalent % of diisopropylamine (component B2), wherein the equivalents % of B1) and B2) were based on 1 equivalent of component A).

Formulation:

| Component A1) | 659.4 g (1.0 equiv.) | IPDI prepolymer from Example 1) |
|---|---|---|
| Component A2) | 118.0 g (0.6 equiv.) | HDI trimer from Example 1) |
| | 204.0 g | solvent naphtha 100 solvent |
| | 204.0 g | 1-methoxypropyl acetate-2 |
| Component B1) | 90.4 g (0.8 equiv.) | ε-caprolactam |
| Component B2) | 80.8 g (0.8 equiv.) | diisopropylamine |
| | 1356.6 g (1.6 equiv.) | blocked NCO groups |
| | Solids content: | Calc. 70.0% |
| | Viscosity at 23° C.: | approx. 4000 mPas |
| | Blocked NCO content: | Calc. 4.9% |
| | 1 equiv. blocked NCO groups: | Calc. 848.0 g |

Method:

The IPDI prepolymer was prepared as described in Example 1. Methoxypropyl acetate, HDI trimer and ε-caprolactam were then added. The reaction mixture was stirred for approx. 1 hour at 110° C. until the NCO content reached 3.1%. It was then allowed to cool to 70 to 80° C., and the mixture of diisopropylamine and solvent naphtha 100 was added in portions. This addition was slightly exothermic. The temperature was maintained at 80° C., and no NCO content remained (IR spectroscopic analysis) approx. 30 minutes after the diisopropylamine addition. A clear, colorless solution having the properties set forth above was obtained.

Example 3

(Comparison)

This blocked polyisocyanate was identical to Example 1 in terms of isocyanate components A1) and A2); however, only ε-caprolactam was used as the blocking agent. The 70% solution of this blocked polyisocyanate had an NCO equivalent weight of 856 g.

Example 4

(Comparison)

This mono-blocked polyisocyanate was identical to Example 1 in terms of the isocyanate components A1) and A2); however, only diisopropylamine was used as the blocking agent. The 70% solution of this blocked polyisocyanate had an NCO equivalent of 839 g.

Example 5

(Comparison)

Preparation of a polyisocyanate blocked exclusively with 1,2,4-triazole was attempted with isocyanate components A1) and A2) in accordance with Example 1.

This 70% solution of the blocked polyisocyanate was cloudy. Crystallization commenced after a brief storage time. This blocked polyisocyanate was consequently unusable as a crosslinker for coil coating compositions.

Example 6

(Example of Use)

The components of the coating compositions and the properties of the resulting coatings are described.

A) Composition of the one-component polyurethane coil coating primers for steel and aluminium, chromate-free (wt. %)

| | Coating Comp. 1 | Coating Comp. 2 | Coating Comp. 3 (Comparison) | Coating Comp. 4 (Comparison) |
|---|---|---|---|---|
| Desmophen ® 690, branched hydroxy polyester, 70% in methoxypropyl acetate, 1 equiv. OH = 1214 g, Bayer AG Crosslinker from: | 32.2 | 32.2 | 32.2 | 32.2 |
| Example 1 | 21.7 | — | — | — |
| Example 2 | — | 22.5 | — | — |
| Example 3 | — | — | 22.7 | — |
| Example 4 | — | — | — | 22.3 |
| Binder | 53.9 | 54.7 | 54.9 | 54.5 |
| Tronox ® R-KB-2, white pigment, Kerr McGee, Germany | 3.1 | 3.1 | 3.1 | 3.1 |
| Shieldex ® C 303, anti-corrosion pigment, Grace, USA | 10.3 | 10.3 | 10.3 | 10.3 |
| Micro Talc ® AT-1, coupling agent, Omga, Germany | 3.1 | 3.1 | 3.1 | 3.1 |
| Acronal ® 4F, 50% in solvent naphtha 200, flow promoter, BASF | 1.1 | 1.1 | 1.1 | 1.1 |
| Dibutyltin dilaurate, 10% in solvent naphtha 200, Air Products, USA | 1.8 | 1.8 | 1.8 | 1.8 |
| Solvent naphtha 200 solvent | 26.7 | 25.9 | 25.7 | 26.1 |
| | 100.0 | 100.0 | 100.0 | 100.0 |

The components listed above were dispersed in a Scandex mixer and applied with a knife to phosphatized steel test sheets (dry film thickness approx. 20 μm). These metal sheets were then stoved for 38 seconds in an Aalborg oven (350° C.), which corresponded to a peak metal temperature (PMT) of 232° C.

B) Coating Properties of the Primers

Because these primers were then deformed and overcoated along with the metal sheet, most particular value was placed on the subsequent testing of adhesion, shown by the T-bend test, resistance to subsequent tearing after aging at 160° C. for 30', and deep-drawability.

| Tests | Coating 1 | Coating 2 | Coating 3 (Comparison) | Coating 4 (Comparison) |
|---|---|---|---|---|
| Pendulum hardness (König) [sec] | 123 | 103 | 80 | 112 |
| Gloss in acc. with Gardener 60°, analogous to ECCA-T2[1)] | 40 | 52 | 42 | 56 |
| Solvent rub test, methyl ethyl ketone (MEK) double rubs, ECCA-T11[1)] and DIN EN 12720 | 100 | 95 | 54 | 100 |
| T-bend test (cracking) best score = 0 | R 0.5 | R 0.5 | R 2.0 | R 1.5 |
| T-bend test (adhesion) best score = 0 | H 0 | H 0.5 | H 2.5 | H 1.5 |
| Tear resistance after T-bend test (30' 160° C.) | R 1.0<br>H 0 | R 1.5<br>H 0 | R 4<br>H 2 | R 3<br>H 1 |
| Deep drawing cup test at room temperature | O.K. | O.K. | not O.K. | not O.K. |
| Tear resistance after deep drawing cup test (30' 160° C.) | O.K. | O.K. | — | — |

[1)]ECCA = European Coil-coating Association

Unlike the comparison coatings, coatings 1 and 2, which were prepared from the polyisocyanates blocked according to the invention were cupable by deep drawing at room temperature. Even after aging of these cups at 160° C. for 30 minutes, no lifting of the coatings was detectable. This crucial test of over-coatability was passed only by the primers according to the invention.

Primers 1 and 2 additionally underwent a further flying stone impact test (in accordance with the German automotive industry association—VDA), in which a normal commercial surfacer and top coat were also applied. The surfacer and the top coat were stoved separately. The coating withstood the two stoving operations undamaged, i.e., without lifting.

| Tests | Coating 1 | Coating 2 | Cataphoretic coating (comparison) |
|---|---|---|---|
| Adhesion Surfacer/primer best score = 0 worst score = 5 | 1 | 1–2 | 1–2 |
| Punctures | 1 | 1 | 1 |
| Appearance | 0–1 | 1 | 1–2 |
| Salt spray test after 120 hours | 1–2 | 2 | 2 |

In a flying stone impact test coatings 1 and 2, which were prepared with the blocked polyisocyanates according to the invention, scored equally with a conventional cataphoretic coating.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A blocked polyisocyanate comprising:

A1) 40 to 70 equivalent % of a predominantly linear NCO prepolymer having an NCO content of 5.0 to 10.0 wt. %, A2) 30 to 60 equivalent % of an aliphatic lacquer polyisocyanate, B1) 30 to 60 equivalent % of ε-caprolactam and B2) 40 to 70 equivalent % of diisopropylamine or 1,2,4-triazole as blocking agents, wherein the equivalent percents of isocyanate components A1) and A2) add up to 100%, and the equivalent percents of blocking agents B1) and B2) add up to 100 to 110%, based on the equivalents of component A).

2. A process for the preparation of the hybrid blocked polyisocyanate of claim 1 which comprises a) preparing NCO prepolymer A1), b) mixing NCO prepolymer A1) with solvent and lacquer polyisocyanate A2) in an amount such that 40 to 70 equivalent % of the isocyanate groups are present in NCO prepolymer A1) and 30 to 60 equivalent % of the isocyanate groups are present in lacquer polyisocyanate A2), c) blocking 30 to 60 equivalent % of the isocyanate groups present in the mixture prepared in step b) with ε-caprolactam and d) blocking the remaining isocyanate groups from component c) with either with 1,2,4-triazole or with diisopropylamine.

3. A coating composition containing the blocked polyisocyanate of claim 1 and a polyhydroxyl compound.

4. A metal substrate coated with the coating composition of claim 1.

* * * * *